Patented June 29, 1937

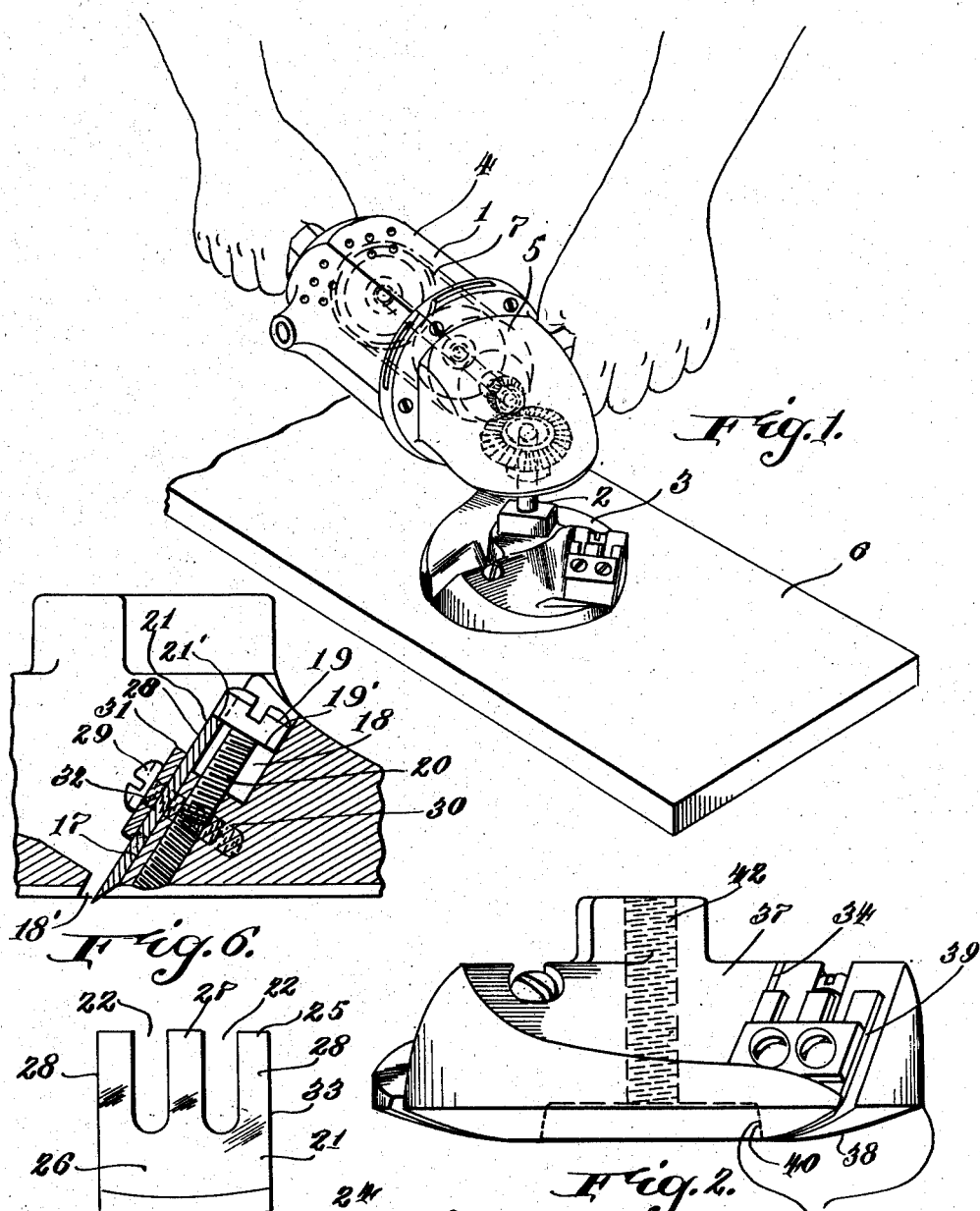

2,085,603

UNITED STATES PATENT OFFICE 2,085,603

MANUALLY PORTABLE POWER-DRIVEN ROTARY PLANER

Henry C. Preston and Alonzo G. Decker, Towson, Md., assignors to The Black & Decker Manufacturing Company, Towson, Md., a corporation of Maryland Application October 26, 1934, Serial No. 750,073

5 Claims. (Cl. 144—119)

The invention relates to a manually portable rotary planer and planer head. The invention supplies new features of the planer head, the cutter blades thereon and the manner of arranging, supporting, attaching and adjusting the cutter blades in their relation to the planer head and includes the combination of this type of planer head with the particular type of portable driving member, i. e., motor casing and tool shaft, the latter being disposed at right angles to the axis of the motor and the motor casing.

The object of the invention is to provide a new and improved portable power driven planer and planer head, including as to the specific claims the improved details referred to. The invention in the more comprehensive form includes both a planer head with a flat face for surfacing work of the smoother finished type, the head being so arranged that it will not go into the work very deeply, and a head with a pronounced convex surface which will do roughing work similar to a jack plane and will cut into the surface of the work so that a considerable depth of wood may be gouged out, and all classes of work such as is done by a hand adze may be performed, the same being included separately and in combination with the electric tool as above outlined.

In the accompanying drawings we have illustrated our invention in the preferred form and in the modified form.

In the drawings:

Figure 1 is a perspective view showing the complete tool in operation.

Figure 2 is an elevation of the convex type of head.

Figure 6 is a fragmentary section on the line 6—6 in Figure 3.

Figure 7 is a detail view of a cutter blade.

Figure 3:
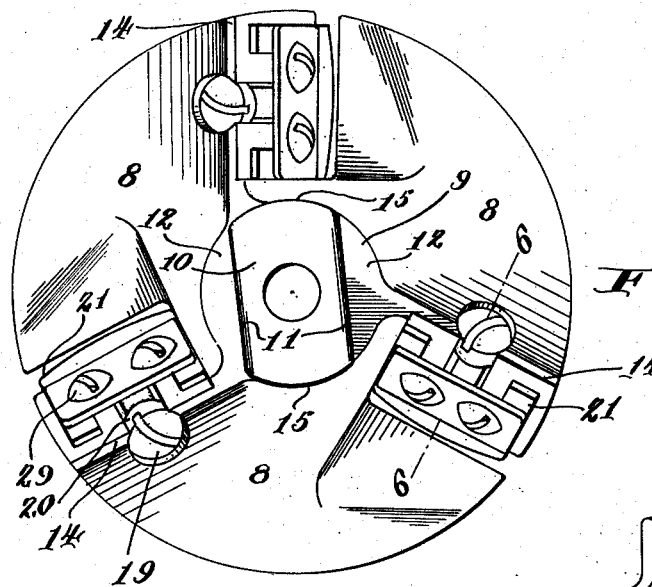
Figure 3 is a top plan view of the head.

Referring to the drawings by numerals, each of which is used to indicate the same or similar parts in the different figures, the construction shown comprises a portable electrical driving unit 1 which is preferably of the general type disclosed in United States Patent No. 1,931,893 to Fleming, et al., a tool shaft 2 and a rotary planer head 3 mounted on the lower end of the shaft in any suitable manner. The details of the mechanism shown in the patent for handling the protecting liquid are not material to the present application.

The driving unit which is preferably a portable electrical tool or any suitable portable power driven tool is in the form shown, practically identical except as to the planer head with the portable sanding disc machine of the patent referred to. In the form shown, it consists of a motor casing or housing 4, shown as of hexagonal cross section, and a gear casing 5, the motor housing in the working position shown has its axis horizontal or parallel to the work indicated at 6, it being understood that the tool is primarily a woodworking tool, the motor indicated in dotted lines at 7 is enclosed within the casing with its axis, i. e., the axis of the motor shaft in parallelism with or coincident with the axis of the housing or casing. The gear casing 5 contains a train of gears as shown, whereby the torque of the motor is communicated at a reduced speed to the shaft 2 which is at right angles to the motor axis.

The planer head 3, the details of which constitute an important feature of the invention, is provided with a plurality of blade cavities 8 arranged about the periphery of the head, which as shown, is circular, having a central boss 9 the sides of which are flattened at the top so that the boss 9 has at the upper end an elongated projection 10 with flat parallel sides 11 and flat horizontal shoulders 12 at each side extending from the bottom edges of the flat upright surfaces 11 to the periphery of the boss, the details of the boss being regarded as non-essential to the invention.

The blade cavities 8 in the form of the invention shown, are three in number, being separated by upwardly tapering elongated peaks 14, which are substantially tangent to the boss, the walls of the blade cavities 8 are inclined downwardly and in a circumferential direction from the peaks 14, and the surfaces of the boss are inclined downwardly and outwardly from the peripheral edges of the shoulders 12 and from the surface of the boss as to the curved ends 15 of the flattened upward extension 10 of the boss, the specific details of the boss and the blade cavities being regarded as non-essential except as recited in the most specific claims.

Each of the blade cavities 8 is provided on its rear wall, as considered in connection with the direction of rotation of the planer head, with a blade supporting surface 17, which is inclined downwardly and forwardly in the direction of rotation from the elongated peak 14, each such surface 17 terminating in a slot 18', which in the form shown is substantially parallel to and spaced slightly forwardly of the corresponding radius of the planer head. Each said blade supporting surface 17, see Figure 6, is in the form of the invention shown, formed with a groove in the body of the planer head parallel to the said surface and of circular cross section, the axis of the circular cross section being parallel to the surface 17 and said groove being open through the surface 17 so that a cord of said circular groove, which may be of about 60°, is open through the surface 17. This groove 18 contains the enlarged head 19 of an adjusting screw 20 which is seated in the body of the planer head, the axis of the screw being parallel to the axis of the groove and the screw being threaded into the body of the planer below and in alignment with said groove.

The blade 21 as shown in Figure 7, is provided with two slots 22 at right angles to the cutting edge of the blade at 24 and extending through the rear surface of the blade at 25, leaving a sufficient free uncut area of the blade at 26 immediately back of the edge. Between the slots 22—22 is an upwardly projecting thrust bar 27 at right angles to the cutting edge 24, and at the outer side of these slots 22—22 are side bars 28, the side bars 28 and the thrust bar 27 being preferably integral with the blade.

The blade 21 is preferably as shown, beveled backwardly from the cutting edge 24, which projects through the corresponding slot 18', the blade in working position resting on the supporting surface 17 and being held in adjusted position thereon by screws 29, which pass through the slots 22 and are threaded into correspondingly threaded holes 30 in the body of the planer head, the blade being further clamped in adjusted position by a plate 31, which overlies the blade 21 being provided with holes 32 through which the screws 29 are passed.

It is of considerable importance that the head 19 of the screw 20 is of excess diameter providing a flat downwardly disposed surface 19' which projects from the groove 18 over substantially the entire width of the back edge 21' of the blade 21 providing an abutment on the screw whereby the blade is thrust downwardly to adjusted position against the frictional engagement of the blade with the blade supporting surface established by the tension of screws 29.

By tightening the screws 29 the blade is clamped in adjusted position and by slightly loosening these screws the blade is permitted to be forced downwardly to an adjusted position by turning the screw 20. In reaching an initial adjustment the screws 29 are slightly loosened so as to permit the blade to be moved upwardly by hand, they are then tightened so as to place a considerable degree of friction on the blade and the blade is then moved downwardly to exact adjustment by turning the screw 20 after which the screws 29 are tightened to hold the blade rigidly in position. The alignment of the blade is maintained by the bearing of the edge 33 against the shoulder 34 at the inner edge of the seat.

Figure 4:
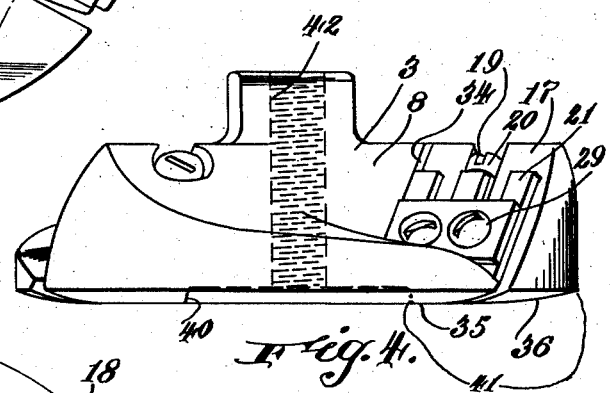
Figure 4 is an elevation of the type of head having a relatively flat face.

It is of interest that the cutter 3, Figures 1 and 4, has a relatively flat bottom surface at 35 which is curved upwardly on a comparatively flat arc at 36 at the edge, the cutter 21 being correspondingly curved. This is termed a flat face cutter for surfacing work of the smoother finished type.

Figure 5:
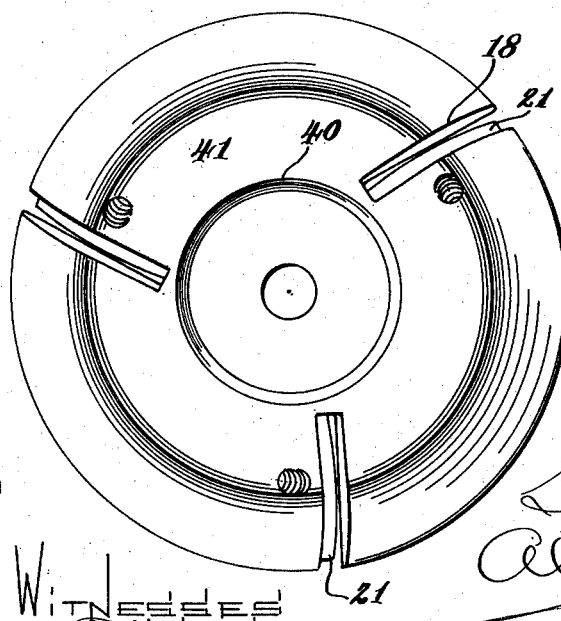
Figure 5 is a bottom plan view of the planer head.

It will be noted that both planer heads are dished or cut away at the center of the bottom surface at 40 as shown in Figures 2 and 5, and that the bottom surfaces are therefore, limited to the peripheral cutting area 41, which is spanned or substantially spanned by the cutting edges 24 of the blades and the slots 18' in which they are mounted, so that cutting takes place substantially across this entire area, and also the planer heads are provided with a central axial bore 42 which is threaded to cooperate with a corresponding thread on the shaft 2, which threaded portion of the shaft is not shown.

The alternative type of head shown at 37 in Figure 2, has a pronounced convex surface at 38, the blades 39 being correspondingly curved. This cutter is adapted to do roughing work similar to the work ordinarily done by a jack plane, and will cut inwardly so that a considerable depth of wood can be gouged out. In this way all classes of work such as are done by means of a hand adze can be performed.

The invention includes in addition to the planer head and blade details, the combination of this type of planer head with the portable power driven hand controlled unit substantially as described, the electrical drive shown is ordinarily provided with a convenient type of switch in close proximity to or mounted on one of the grips, the same not being shown in the illustration but clearly disclosed in the prior patent referred to. The operation of the tool is believed to be fully disclosed in connection with the description of the construction of the driving unit and planer head, which are operated in combination as an integral tool somewhat after the manner of the sanding disc machine of the prior patent cited, the manner of cutting having been described above in a previous paragraph.

We have thus described specifically and in detail the planer head and portable power driven unit for driving the same, the description being specific and in detail in order that the manner of constructing, applying, operating and using the portable power driven planing tool of the invention, and assembling and adjusting the planer head will be clearly understood. However, the specific terms herein are used descriptively rather than in a limiting sense the scope of the invention being defined in the claims.

What we claim as new and desire to secure by Letters Patent is:—

1. The combination with a manually portable power operated driving unit having an elongated substantially continuous rotor housing and a rotor in the rotor housing adjacent one end thereof, a tool shaft driven by the rotor and disposed at right angles to the rotor axis and projecting a substantial distance from the housing adjacent the other end thereof, a planer head mounted on the tool shaft, the same consisting of a body having a downwardly disposed peripherally located surface with substantially radial slots extending therethrough, blades shaped as to their edges in correspondence with said surface located in said slots, means for clamping the blades, and adjusting means for each blade consisting of a screw having a head with an overhang of excess area, the planer head having blade supporting surfaces inclined upwardly and backwardly as to the direction of rotation the supporting surface having a groove therein disposed in the direction of incline and of a cross section to receive the screw head, which is located therein, means for pressing the blade against said surface to apply friction thereto to hold the blade in position, the screw being seated in the planer head parallel to said blade supporting surface with a portion of the screw head extending outwardly from the groove over the edge of the blade to apply adjusting pressure by means of the screw to the blade forcing it downwardly to adjusted position.

2. In a planer head for a portable power driven rotary tool, a head portion having means at the center for attachment to a tool shaft and cutter cavities arranged around said means, said cutter cavities being provided each with an inclined blade supporting surface, said planer head having in connection with each blade cavity a groove extending into said surface and disposed at right angles to the cutting edge of said blade, a screw seated in said planer head parallel to said surface and at right angles to said cutting edge and having a screw head of excess area with a flat bottom surface, in said groove, a blade with frictional means for attaching it to said surface, the screw head projecting from said groove and extending over the back edge of the blade to provide for adjustment of said blade downwardly overcoming the friction of said means.

3. In a planer head for a portable power driven rotary tool, a head portion having means at the center for attachment to a tool shaft and cutter cavities arranged around said means, said cutter cavities being provided each with an inclined blade supporting surface, said planer body having in connection with each blade cavity a groove extending into said surface and having its sides parallel to said surface, a screw seated in said planer head parallel to said surface and at right angles to the edge of said blade, the screw having a head of excess area, in said groove and projecting therefrom through said surface, a blade with frictional means for attaching it to said surface, the screw head extending over the edge of the blade to provide for adjustment of said blade downwardly, overcoming the friction of said means, the said friction means comprising screws seated in the planer head at right angles to the blade supporting surface, the blade being slotted to receive said screws and having a thrust bar between said slots on which is located the surface of the blade which is engaged by the head of the adjusting screw.

4. In a planer head for a portable power driven rotary tool, a head portion having means at the center for attachment to a tool shaft and cutter cavities arranged around said means, said cutter cavities being provided each with an inclined blade supporting surface, said planer head having in connection with each blade cavity a groove extending through said surface and parallel to said surface, a screw seated in said planer head parallel to said surface and having a head of excess area with a flat bottom surface, a blade with frictional means for attaching it to said surface, the screw head extending over an edge of the blade to provide for adjustment of said blade downwardly overcoming the friction of said means.

5. In a planer head for a portable power driven rotary tool, a head portion having means at the center for attachment to a tool shaft and cutter cavities arranged around said means, said cutter cavities being provided each with an inclined blade supporting surface, said planer head having in connection with each blade cavity a groove extending through said surface and parallel to said surface, a screw seated in said planer head parallel to said surface and having a head of excess area with a flat bottom surface, a blade with frictional means for attaching it to said surface, the screw head extending over an edge of the blade to provide for adjustment of said blade downwardly overcoming the friction of said means, the said friction means comprising screws seated in the planer head at right angles to the blade supporting surface, the blade being slotted at right angles to its cutting edge to receive said screws, the blade having a thrust bar between said slots at the upper end of which is located the rear surface of the blade which is engaged by the head of the adjusting screw, the blade having at one side beyond said grooves a guide surface substantially at right angles to the cutting edge, the cutter head having a cooperating guiding surface engaged thereby.

HENRY C. PRESTON.
ALONZO G. DECKER.